United States Patent [19]
Ma

[11] 3,757,490
[45] Sept. 11, 1973

[54] CHROMATOGRAPHIC ADSORBENTS
[76] Inventor: James C. N. Ma, 138 B Boundry St., Kowloon, Hong Kong
[22] Filed: June 7, 1971
[21] Appl. No.: 150,849

[52] U.S. Cl............................ 55/67, 55/386, 55/389, 210/198 C
[51] Int. Cl............................................ B01d 15/08
[58] Field of Search...................... 55/67, 386, 387, 55/389, 522; 210/31 C, 198 C, 502, 503

[56] References Cited
UNITED STATES PATENTS
2,956,016  10/1960  Leppla................................. 210/503
3,283,483  11/1966  Halasz et al. ........................ 55/386
3,502,217   3/1970  Brockner et al. ............... 210/198 C Primary Examiner—John Adee
Attorney—Townsend & Townsend

[57] ABSTRACT

Improved chromatographic separations are achieved with solid-liquid chromatography by employing particles of a specified particle size distribution, whereby the large to small size particle weight ratio is defined as having 70 to 90 parts of coarse particles, wherein at least 90 weight percent of the particles have diameters within 10 percent of the average diameter, and 10 to 30 parts of fine particles, the average diameter being 10 to 20 percent of the average diameter of the coarse particles, and having at least 50 weight percent of the particles within 50 percent of the average diameter of the fine particles.

19 Claims, No Drawings

CHROMATOGRAPHIC ADSORBENTS

BACKGROUND OF THE INVENTION

Field of the Invention

Chromatography finds wide use in the separation of mixtures. When dealing with small amounts of substances, depending on the complexity of the mixture and the amounts of the various components present, thin layer chromatography, thick layer chromatography or column chromatography, may be advantageously employed. These methods, however, have inherent deficiencies. Where a mixture has minor components, the concentration may be too low to be seen. In thin layer chromatography, if one attempts to increase the concentration of the mixture on the plate, the major components tend to overload the chromatogram. A tailing effect results from the enriched major components which obscures the minor components. In effect, one is limited to use very small amount of material and therefore is unable to resolve the minor components. In column chromatography, larger amounts of material can be used to overcome such shortage, but the adsorbent is limited to a coarse particle size in order to maintain a reasonable flow rate. Therefore the resolution of column chromatography is always poorer than thin layer chromatography.

In order to enhance the resolving power of thin layer chromatography, efforts have been concentrated toward enhancing the activity of the adsorbent, varying the nature of the solvents as well as changing other physical characteristics of the system. See Stahl, Thin Layer Chromatography, Springer-Verlag, N.Y., 1969; Thin layer chromatography, Tech. Bull. No. 22, Brinkmann Instruments, Inc., N.Y., 1962; Janchen, Thin layer chromatography, Cumulative Bibliography I, 1965–1967, and Cumulative Bibliography II, 1967–1969, Camag, Muttenz, Switzerland.

Other methods of separation can also enjoy the benefits of enhanced resolution. These include ion-exchange chromatography gas-liquid chromatography, molecular sieves, etc. All of these systems are based on surface-fluid interaction, where maximum surface is desirable, all other things being equal.

The importance of improving the resolution of chromatography is that one could obtain a better assurance that one has resolved the mixture into all of its significant components; that one could obtain small amounts of samples in extremely high purity; and, finally, one could achieve these results in both small and large scale.

SUMMARY OF THE INVENTION

Adsorbents are provided for use in solid-liquid chromatography, whereby a specified size distribution of the particles is provided, there being a high weight ratio of larger particles to smaller particles.

DETAILED DESCRIPTION

The subject invention employs a mixture of solid chromatographic adsorbents which ideally would have from 70 to 90 weight percent, preferably from about 80 to 90 weight percent of coarse or large size particles and from 30 to 10 weight percent, preferably from about 20 to 10 weight percent of fine or small size particles. As an average, the diameter of the fine particles would be from about 10 to 20 percent of the larger or coarser particles, preferably about 12 to 18 percent of the larger or coarser particles.

In column chromatography, there would be additional coarser particles besides the coarser one in 2-particle size adsorbents. In such 3-particle size adsorbents, the ratio both in weight percentage and in diameter of the additional coarser adsorbents to the medium size adsorbents is very similar to that used in 2-particle size adsorbents. In a similar way, multiparticle size adsorbents can be made for industrial scale chromatographic separation.

In providing columns having three or more sized adsorbents, each size adsorbent is in the similar relationship to the larger and smaller adsorbent as in the case of the 2-particle size adsorbents: the diameter of the smaller particles is 10 to 20 percent of the immediate particles and is present in from 15 to 50 weight percent of the next larger particles. This will usually result in a mixture of small, medium or large particles having small particles in from 2 to 10 parts based on 100 parts of the next two larger sized particles.

As a practical matter, while particles are sieved and categorized as to size, they are usually present as a distribution over a relatively narrow range of micron sizes. Therefore, the simplest embodiment of the subject invention is to combine a coarse chromatographic adsorbent with a fine chromatographic adsorbent, where the two adsorbents have the following characteristics. In the fine particles, at least 50, preferably at least 75 weight percent, of the particles will have diameters within 50 percent, either greater or lesser, of the diameter of the particles at the weight average of the fine mixture. In the coarser particles, most of the particles, preferably 90 weight percent will have diameters within 15 percent, either greater or lesser than the diameter of the particles at the weight average coarse mixture. That is, if the weight average particles have a diameter of 100 microns, substantially all of the particles in the mixture will be in the range of 90 microns to 110 microns. The coarse and fine particles are mechanically mixed to a substantially homogeneous mixture in accordance with the weight ratios indicated above.

While the subject invention is not intended to be limited to any theory, it is believed that the high resolution achieved by the subject invention is obtained because of the following physical situation. Chromatographic separation is dependent, both on surface area and voids. The nature of the particle shape is such that when a column is packed, in the absence of very small particles, a substantial amount of free space exists between the particles. The ability to resolve a mixture into its components depends on the surface area of the adsorbent, so as to maximize the number of times a component is adsorbed and desorbed from the surface of the sorbent. However, if the particles are so closely packed as to maximize surface area, but preclude voids, then the solvent cannot significantly penetrate the surface and passage of the solvent along the chromatogram is either extremely slow or nonexistent. By employing a mixture of fine and coarse particles, an optimum amount of surface area and void is achieved, so as to prevent a continual flow of solvent along the chromatogram, while providing the optimum efficiency as the surface area.

The use of the size distribution of the subject invention can be of advantage in any resolution of a mixture based on the interaction of a fluid — gas or liquid — and a solid surface, where there is a differential interaction between elements of the fluid and the surface. The interaction can be adsorption, solubilization, dipole or ion interaction or based on cavity size.

In this invention, any of the common adsorbents may be used such as alumina, silica gel, kieselguhr, magnesium oxide, graphite, active carbon, polyamide, etc. as used in liquid-liquid and solid-liquid chromatography. Also, common supporters may be used being coated with a stationary phase as used in gas phase chromatography, or ion-exchange resins or molecular sieves. For example, in thick layer chromatography, the chromatoplate may be prepared according to the means known in the art such as pour-and-tap technique or with a spreader; but the thickness of the layer made from this modified adsorbent may be increased to a few millimeters without cracking. The thick layer chromatogram will usually be from about 0.5 mm thick to 4 mm. thick. In column chromatography, this invention enables one to use an adsorent with smaller diameter than before. Since the finer adsorbent, which gives higher resolution are grouped by coarser ones, the problems of uneven packing, cracking after the column running dry, low flow rate if fine adsorbent is used, etc., are greatly improved. Similarly, finer supporting, packings may be employed in gas phase chromatography to produce a column with higher resolution and one which is easier to pack.

A number of different adsorbent compositions were prepared using commercial silica gel. To provide the fine adsorbents, a sedimentation method was used to separate the non-acid washed silica gel for thin layer chromatography into a few fractions. The particle size distribution curve of each fraction was determined by light scattering photometer using Stokes' law to calculate the diameter of the particles. For the coarse adsorbents, commercial silica gel for column chromatography was washed with chloroform through U.S. standard sieves. The material retained on each sieve was dried and shaken for one hour.

The following table indicates the different adsorbent mixtures in various grades. XC intends extra coarse, C intends coarse, M intends medium, F intends fine and XF intends extra fine. The numbers 2,3 and 4 designate compositions which are useful in thick layer chromatography, column chromatography and industrial scale chromatography respectively.

PARTICLE SIZE OF ADSORBENTS

| Category | Nominal Size* | Ratio by wt. | | | Method |
|---|---|---|---|---|---|
| | | XC-2 | XC-3 | XC-4 | |
| Extra-coarse | 29 μ ± 20% | 15% | 4% | | Sedimentation |
| | 230 μ ± 10% | 85% | 14% | | Sieve No. 70/60 |
| | 1840 μ ± 10% | | 82% | | Sieve No. 12/10 |
| | | C-2 | C-3 | C-4 | |
| Coarse | 20 μ ± 20% | 15% | 4% | 2% | Sedimentation |
| | 163 μ ± 10% | 85% | 14% | 4% | Sieve No. 100/80 |
| | 1300 μ ± 10% | | 82% | 13% | Sieve No. 16/14 |
| | 10.36mm ± 10% | | | 81% | 7/16" passing 9/8" retained |
| | | M-2 | M-3 | M-4 | |
| Medium | 15 μ ± 20% | 15% | 4% | 2% | Sedimentation |
| | 115 μ ± 10% | 85% | 14% | 4% | Sieve No. 140/120 |
| | 920 μ ± 10% | | 82% | 13% | Sieve No. 20/18 |
| | 7175 μ ± 10% | | | 81% | 5/16" passing 1/4" retained |
| | | F-2 | F-3 | F-4 | |
| Fine | 10 μ ± 25% | 15% | 4% | 2% | Sedimentation |
| | 81 μ ± 10% | 85% | 14% | 4% | Sieve No. 200/170 |
| | 650 μ ± 10% | | 82% | 13% | Sieve No. 30/25 |
| | 5210 μ ± 10% | | | 81% | Sieve No. 4/3-1/2 |
| | | XF-2 | XF-3 | XF-4 | |
| Extra-fine | 7 μ ± 30% | 15% | 4% | 2% | Sedimentation |
| | 58 μ ± 10% | 85% | 14% | 4% | Sieve No. 270/230 |
| | 460 μ ± 10% | | 82% | 13% | Sieve No. 40/35 |
| | 3680 μ ± 10% | | | 81% | Sieve No. 6/5 |

Remark: * μ is micron

In order to demonstrate the improved resolution capability of the adsorbent of the subject invention, the following categories of silica gel were used to separate different types of organic mixtures with different ranges of molecular weight. Twenty-five grams of the selected adsorbent (see prior table) was stirred gently with 55 to 65 ml of water containing 4 ml of methanol. The amount of water will vary with the moisture content of the silica gel; the specific amount of water to be employed can be readily determined for providing the best consistence without cracking on the plate. The suspension is gently mixed, so as to provide a relatively uniform dispersion, which should be free of air bubbles, and is poured onto a 20 × 20 cm glass plate by pour-and-tap technique. The plate is then dried by heating at 115° ± 30°C for one hour and then cooled in a desiccator. Plates were prepared in accordance with the above procedure for use in the following experiments.

A mixture of low molecular weight essential oils and sesquiterpenoids was obtained from the petroleum-ether extract of *Acorus calamus*. The extract was previously separated, employing ordinary thin layer chromatography with commercial silica gel, into four spots, and with gas phase chromatography into five major peaks using different percentages of polar and non-polar stationary phases at different temperatures with and without programming. When the mixture was placed on a 1.7 mm thick chromatographic plate prepared from 25 gm. of narrow range fine silica gel as used in Category F-2, and developing twice from pentane : benzene : ether mixture (12 : 12 : 1), the same solvent system used in ordinary thin layer chromatography which gave 4 spots, 15 different zones were obtained.

In the second case, a mixture of medium molecular weight alkaloids was obtained from the chloroform extract of the root of *Coptis chinensis*, which had been previously extracted with petroleum-ether to remove oil soluble components. Numerous papers have reported that only 3 to 7 alkaloids were able to be isolated by thin layer chromatography and other methods. Efforts to repeat the work using ordinary thin layer chromatography as the prior art provided also 7 spots. By using the modified adsorbent F-2 silica gel of 1.7 mm thick chromatoplate, developing from a solvent system containing chloroform : methanol : amyl alcohol (8 : 2 : 1), 32 different zones were obtained as visually counted under two ultraviolet lights of 366 μ and 254 μ wave-length.

In the third experiment, F-3 silica gel was used to pack chromatographic columns. The optimum solvent system for each particular mixture was first found from thin layer chromatography, and then applied to the column with gradual increments of more polar solvent. The fractions eluted from the column were concentrated and checked on a thin layer chromatogram. With the various types of organic mixtures, the separation from the columns with the modified adsorbent of this invention was found to be very similar to that from the thin layer chromatogram. The flow rate of the column was reasonably improved.

The subject invention provides a number of distinct advantages. With the same size chromatogram as used previously, much greater resolution is achieved. Column chromatography can now be directly related to the results obtained with thin layer chromatography, so that the variables for a particular separation can first be determined with a very small sample on a thin layer chromatogram. These variables may then be directly related to separations of a much larger sample on a column. Packing of chromatograms is made easier and flow rate enhanced. Therefore, by using the adsorbent mixture of this invention, greater efficiency is achieved in preparing the chromatogram, using the chromatogram and finally, in the results obtained from the chromatogram.

I claim:

1. In a chromatographic column and chromatoplate, a particle mixture having high resolution capability because of a specific particle size distribution, having 70 to 90 parts of coarse particles, wherein at least 90 weight percent of the particles have diameters within 10 percent of the average diameter, and 10 to 30 parts of fine particles, the average diameter being from 10 to 20 percent of the average diameter of the coarse particles, and having at least 50 weight percent of the particles within 50 percent of the average diameter of the fine particles.

2. A mixture according to claim 1, wherein said particles are composed of the adsorbent silica gel.

3. A mixture according to claim 2, having from 80 to 90 parts of said coarse particles and from 20 to 10 parts respectively of said fine particles, the average diameter for said fine particles being 12 to 18 percent of said coarser particles.

4. A mixture according to claim 1, wherein said particles are composed of the adsorbent alumina.

5. A mixture according to claim 4, having from 80 to 90 parts of said coarse particles and from 20 to 10 parts respectively of said fine particles, the average diameter for said fine particles being 12 to 18 percent of said coarser particles.

6. A mixture according to claim 1, having more than 2 different sized particles, wherein the relationship of each sized particles to the next larger sized particles is the same as the relationship of said coarse particles to said fine particles.

7. A mixture according to claim 1, wherein said particles are molecular sieves.

8. A mixture according to claim 1, wherein said particles are gas phase chromatograph support packing.

9. A mixture according to claim 1, wherein said particles are ion-exchange resin.

10. In a method for resolving a mixture of materials by introducing said mixture in a fluid state onto a chromatographic column or chromatoplate composed of a packing of particles of various dimensions, the improvement which comprises employing particles having a size distribution wherein 70 to 90 parts are coarse particles having at least 90 weight percent of the particles having diameters within 10 percent of the average diameter, and 30 to 10 parts are fine particles having an average diameter in the range of from 10 to 20 percent of the coarser particles, at least 50 weight percent of said fine particles having diameters within 50 percent of the average diameter.

11. A method according to claim 10, having additional coarser particles, wherein the relationship of each sized particles to the next smaller sized particles is substantially the same as the relationship of the medium particles to the fine particles.

12. A method according to claim 10, wherein said adsorbent is silica gel.

13. A method according to claim 10, wherein said adsorbent is alumina.

14. A method according to claim 10, wherein said particles are molecular sieves.

15. A method according to claim 10, wherein said particles are gas phase chromatographic supporter.

16. A method according to claim 10, wherein said particles are ion exchange resins.

17. A method according to claim 10, wherein said resolution zone is a thick layer chromatography.

18. A method according to claim 10, wherein said resolution zone is a column chromatography.

19. A method according to claim 10, wherein said resolution is a gas phase chromatography.

* * * * *